United States Patent
Engdahl (10) Patent No.: US 7,688,920 B2
(45) Date of Patent: Mar. 30, 2010

(54) AFC WRAP-AROUND DETECTION

(75) Inventor: Karin Engdahl, Staffanstorp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 884 days.

(21) Appl. No.: 11/457,018

(22) Filed: Jul. 12, 2006

(65) Prior Publication Data

US 2008/0013649 A1   Jan. 17, 2008

(51) Int. Cl.
*H04L 27/06* (2006.01)
*H04B 1/69* (2006.01)

(52) U.S. Cl. .................. 375/344; 375/147

(58) Field of Classification Search ......... 375/142–145, 375/147–150, 260, 326, 343, 344; 370/335, 370/342; 455/71, 182.2, 192.2; 342/199, 342/357.05
See application file for complete search history.

(56) References Cited

U.S. PATENT DOCUMENTS

| | | | |
|---|---|---|---|
| 5,909,148 A | | 6/1999 | Tanaka |
| 2004/0005022 A1* | | 1/2004 | Zhu et al. ................ 375/365 |
| 2005/0157801 A1 | | 7/2005 | Gore et al. |
| 2006/0171449 A1* | | 8/2006 | Lindoff et al. ............. 375/148 |
| 2008/0014881 A1* | | 1/2008 | Engdahl et al. ........... 455/187.1 |

FOREIGN PATENT DOCUMENTS

| | | |
|---|---|---|
| EP | 0 731 587 A2 | 9/1996 |
| EP | 1 014 636 A | 6/2000 |
| EP | 1 168 617 A2 | 1/2002 |
| WO | 2005/074224 A | 8/2005 |

OTHER PUBLICATIONS

Arslan et al: "Doppler Spread Estimation for Wireless Mobile Radio Systems", WCNC 2000—IEEE Wireless Communications and Networking Conference, No. 1, Sep. 2000, pp. 1075-1079.

Dong et al.: "Symbol Error Probability of Two-Dimensional Signaling in Ricean Fading With Imperfect Channel Estimation", IEEE Trans on Veh Tech, vol. 54, No. 2, Mar. 2005, pp. 538-549.

European Standard Search Report, completed Jan. 31, 2007, in connection with U.S. Appl. No. 11/457,018.

* cited by examiner

*Primary Examiner*—Young T. Tse
(74) *Attorney, Agent, or Firm*—Potomac Patent Group PLLC (57) ABSTRACT

A wrap-around event in an automatic frequency control (AFC) in a receiver in a communication system can be detected by performing AFC-like operations on one or more additional channel estimates of the strongest communication path. Once a wrap-around event is detected, a correct frequency reference can be restored by forcing the AFC into a high-speed mode of operation, which gives the AFC a chance to restore the correct frequency reference, or by applying a momentary frequency reference change.

20 Claims, 6 Drawing Sheets

AFC WRAP-AROUND DETECTION

BACKGROUND

This invention relates to mobile wireless communication systems.

In a typical wireless communication system, each device, e.g., a user equipment (UE), a base station (BS), etc., has a local oscillator (LO) that defines a local time reference. It is crucial that the LOs of devices communicating with each other are aligned as precisely as possible. If two devices' LOs are not aligned, their time references drift in relation to each other, which can result in the devices' being no longer capable of receiving information properly from each other and in loss of the connection.

LO alignment is particularly important to wireless communication systems like wideband code division multiple access (WCDMA) mobile telephone systems and other digital mobile telephone systems. In such systems, the UE uses automatic frequency control (AFC) to adjust its LO so that it aligns well with the LOs of the BS(s) to which the UE is connected.

A WCDMA communication system uses direct-sequence spread-spectrum techniques. Pseudo-noise scrambling codes and orthogonal channelization codes separate BSs and physical communication channels, respectively, in the downlink (BS-to-UE) and uplink (UE-to-BS) directions. Scrambling and channelization codes are well known in the art, and WCDMA and other third-generation (3G) and future communication systems operate in accordance with standards promulgated by the Third Generation Partnership Project (3GPP).

The operation of a typical AFC involves studying communication-channel parameters over time and attempting to adjust the LO based on at least such parameters. For example, complex-valued estimates of the impulse response of a communication channel might be studied over time, and the adjustment of the LO may be done such that no rotation of the channel estimates is seen in the complex plane. That kind of adjustment is based on the fact that phase-plane rotation corresponds to relative frequency drift, which in turn corresponds to relative time reference drift.

Figure 1:
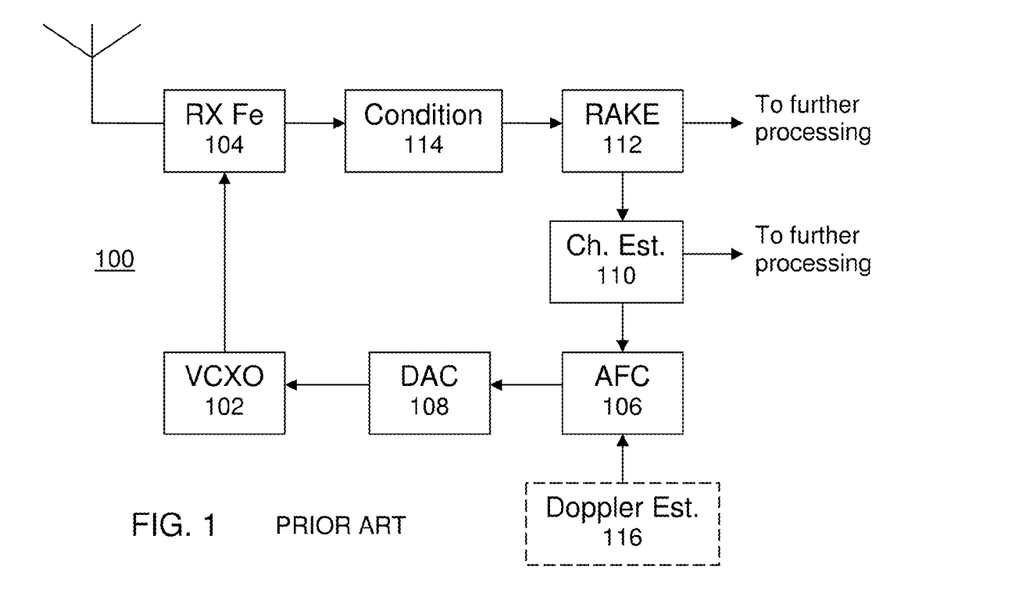
FIG. 1 is a block diagram of a portion of a typical user equipment.

FIG. 1 is a block diagram of an apparatus 100, which may be a portion of a typical UE, and depicts the operation of a typical AFC. A voltage-controlled crystal oscillator (VCXO) 102 generates the LO signal used by a receiver front end (RX Fe) 104 and a transmitter front end (TX Fe) (not shown). The frequency of the LO signal produced by the VCXO 102 is responsive to a control signal $f_{err}$ generated by an AFC 106, and as illustrated, the control signal produced by the AFC 106 may be converted to an analog control voltage by a digital-to-analog converter (DAC) 108. The AFC 106 generates the control signal $f_{err}$ based on channel estimates $\hat{h}_f$ produced by a channel estimator 110, which typically provides such estimates to other devices in the UE. The channel estimator 110 generates the channel estimates from correlated signals provided by the "fingers" (correlators) of a RAKE processor 112, which generates the correlated signals from signals from the RX Fe 104 that have been digitized by an analog-to-digital converter (ADC), filtered, and otherwise processed in conditioning block 114.

Channel estimation and RAKE processing are well known in the art. Channel estimation generally involves multiplying the correlated signals with the complex conjugates of known signals (or pilots), and possibly averaging the results over time. U.S. Patent Application Publication No. 2005/0105647 by Wilhelmsson et al. for "Channel Estimation by Adaptive Interpolation" describes channel estimation in a communication system using orthogonal frequency division multiplex. RAKE processing, which typically includes correlating and combining, is described in, for example, John G. Proakis, "Digital Communications", 3rd ed., pp. 797-806, McGraw-Hill; and U.S. Pat. No. 6,922,434 by Wang et al. for "Apparatus and Methods for Finger Delay Selection in Rake Receivers". Signals from the channel estimator 110 and RAKE processor 112 are typically used in further processing operations carried out by the UE.

Some UEs have AFCs that can be selectively operated in either a high or a low speed mode. As depicted in FIG. 1, the speed mode in such UEs can be selected based on a control signal from a Doppler-spread estimator 116 that applies an argument- (or zero-) crossing algorithm or a level-crossing algorithm, for example, to signals received by the UE. Other UEs have only one speed mode, and thus do not need the Doppler estimator 116 for speed-mode adjustment, although such UEs may use Doppler estimates for other purposes. It will be understood that one or two speed modes are described here solely as examples; more than two speed modes can be used without departing from the scope of this invention.

The AFC 106 typically generates the control signal $f_{err}$ in the following way, which is just one of many possible examples. In low-speed mode, one channel estimate $\hat{h}_f$ is collected for each RAKE finger f during a given time period, e.g., during each of the successive time slots into which the received signal is organized, and in high-speed mode, five channel estimates per finger are collected in each slot. The AFC 106 uses the current channel estimate $\hat{h}_f$ and a channel estimate previously collected $\hat{h}_f^{previous}$ to determine a value y given by:

$$y = \sum_f \hat{h}_f (\hat{h}_f^{previous})^*$$

where the asterisk denotes complex conjugation. The value y may be filtered, for example according to:

$$y_{filt} = \lambda(y - y_{filt}^{previous}) + y_{filt}^{previous}$$

where $y_{filt}$ is the current filtered value, $\lambda$ is a filter parameter, and $y_{filt}^{previous}$ is the filtered value for the previous slot. In high-speed mode, $y_{filt}^{previous}$ is the filtered value for the previous channel estimate. It will be understood that the filter state is appropriately initialized or reset whenever a UE frequency reference update ($\Delta f_{UE}$) or a speed-mode change occurs. The reported frequency error $f_{err}$ is then given by:

$$f_{err} = \phi/2\pi\Delta t$$

where the phase angle $\phi = \arg(y_{filt})$ and $\Delta t$ is the time interval between two consecutive updates of the AFC (e.g., two consecutive collected channel estimates). For just two of many possible examples, $\Delta t$ may be 1/1500 in low-speed mode (i.e., one slot is 1/1500 second) and 1/7500 in high-speed mode. These computations are conveniently called the "typical AFC computations" in this application.

In an AFC such as that described above, there is a risk of AFC wrap-around, which occurs when $|\Delta f| > \frac{1}{2}\Delta t$, where $\Delta f$ is the actual frequency error and $\Delta t$ is the time interval between two consecutive updates of the AFC. This corresponds to situations where the channel estimates rotate more than $\pm\pi$ between successive AFC updates, which result in the frequency error $f_{err}$ reported by the AFC being in error by a multiple of $1/\Delta t$ Hz. For example, if the AFC updates once per slot, which is typical of low-speed or single-speed mode, then ½Δt=750 Hz. In the typical high-speed mode, the AFC is updated five times per slot, and then ½Δt=3750 Hz. It will be noted that the UE usually goes out-of-sync and loses the connection if the correct frequency reference is not restored within approximately 50-150 slots.

AFC wrap-around is a phenomenon that arises from the discrete sampling of the frequency error by the AFC and is particularly likely in situations where the relative speed of a transmitter and receiver is high and rapidly changing and the AFC is operating in low-speed mode. In the context of a UE in a 3G mobile telephone system, those situations include passing close by a BS (e.g., at a distance less than 10 meters (m) or so). In those situations, the actual frequency error Δf becomes $\Delta f=2f_D$ after passing the base station (assuming no frequency error before passing), where $f_D$ is the Doppler frequency shift given by $f_D=vf_c/c$, in which v is the relative velocity of the transmitter and receiver (e.g., a BS and a UE), $f_c$ is the carrier signal's frequency (about 2 GHz in some 3G mobile telephone systems), and c is the speed of light. Hence, an AFC wrap-around event can occur for velocities around and above 185 kilometers per hour (km/h) in the close-passing situation with Δt=1/1500.

Results of simulations of the close-passing situation are depicted in FIGS. 2-4 for a one-tap, line-of-sight (LOS) (no fading) channel without interference. The UE was assumed to pass a BS at a distance of 2 m, and channel estimation was almost perfect, as the simulated signal-to-noise ratio (SNR) of the channel estimates was 17 dB. For the simulations, the AFC filter parameter was set to λ=0.02. The same settings apply to all simulation results shown in this application except as otherwise noted.

Figure 2A:
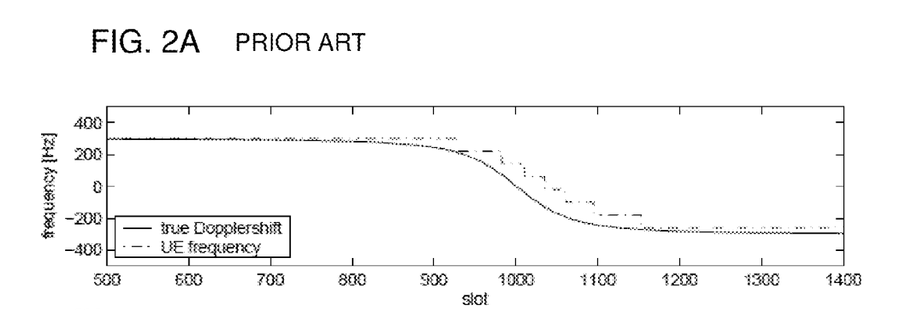
FIG. 2 shows the results of a simulation of a user equipment closely passing a base station at a distance of two meters at a speed of 150 km/h, with an AFC in low-speed mode.
Figure 2B:
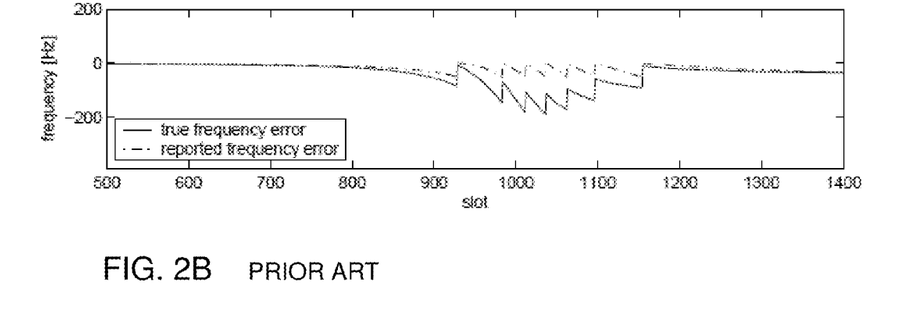
Figure 3A:
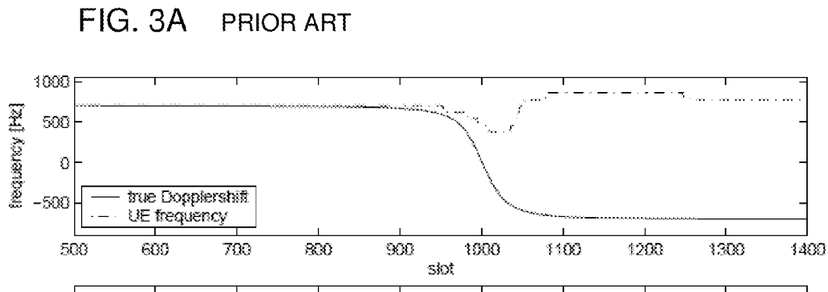
FIG. 3 shows the results of a simulation of a user equipment closely passing a base station at a distance of two meters at a speed of 350 km/h, with an AFC in low-speed mode.
Figure 3B:
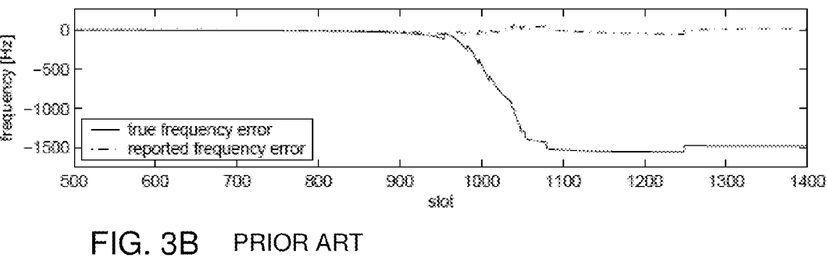
Figure 4A:
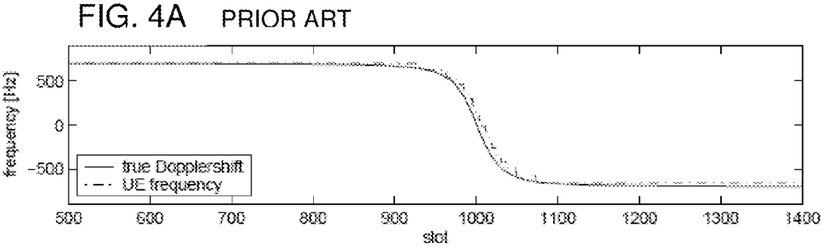
FIG. 4 shows the results of a simulation of a user equipment closely passing a base station at a distance of two meters at a speed of 350 km/h, with an AFC in high-speed mode.
Figure 4B:
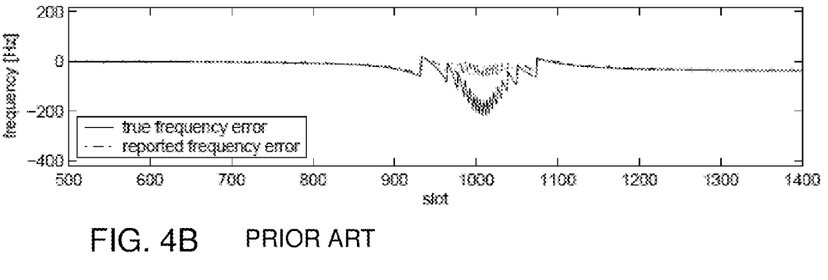

In FIGS. 2A, 3A, 4A, the dot-dash line shows the apparatus frequency reference (without the carrier frequency component), and the solid line shows the actual Doppler frequency shift. In FIGS. 2B, 3B, 4B, the dot-dash line shows the AFC reported frequency error $f_{err}$, and the solid line shows the actual frequency error. Frequency shift or error is shown on the vertical axes and time in slots is shown on the horizontal axes in the figures.

From FIGS. 2 and 3, it can be seen that the AFC managed to follow the frequency change at a relative velocity of 150 km/h (FIG. 2), but not at 350 km/h (FIG. 3), when the AFC was in low-speed mode. FIG. 4 shows high-speed mode at 350 km/h, where the correct frequency reference was successfully tracked.

As noted above, if the AFC is in high-speed mode, wrap-around occurs when Δf>3750 Hz, which corresponds to around and above 935 km/h in the close-passing situation. Thus, comparing FIGS. 3 and 4, if the AFC could be in or be put in high-speed mode at the right time, the AFC wrap-around problem would be solved for all currently realistic land-based velocities. Running the AFC in high-speed modes at all times is, however, not always preferable because then the AFC becomes more sensitive to noise and there may be unnecessary toggling in UE frequency compensations in high-speed mode.

Thus, some devices include Doppler estimators (see block 116 in FIG. 1) to determine the speed-mode for AFC operation. As described above, two different Doppler estimation algorithms, the level-crossing algorithm and the argument-crossing (or zero-crossing) algorithm, may be used. It will be understood, however, that in general any Doppler estimation algorithm known in the art may be used. All of these algorithms, however, have problems with detecting high-speed situations under LOS conditions.

The level-crossing algorithm counts the number of times the absolute value of the complex channel estimate crosses a given level. It is assumed that the higher the velocity is, the faster the fading is, and hence that the number of level crossings per unit time corresponds to the velocity. This is an accurate method as long as all of the paths (fingers) used by the AFC are Rayleigh-distributed. In LOS conditions, however, the strongest path is typically dominant and has a Ricean distribution, which is to say that the strongest path may be fading very weakly or hardly at all. In such conditions, a Doppler estimator that uses a level-crossing algorithm cannot detect high-velocity situations, and thus the AFC would remain in low-speed mode.

A variant of the argument-crossing algorithm counts the number of times that the complex channel estimate crosses either of the imaginary and real axes. It is assumed that the phase variations become faster with higher velocity, and hence the number of crossings per unit time is assumed to correspond to the velocity. This is also an accurate method as long as all of the paths involved are Rayleigh-fading. In LOS conditions, however, the phase shift due to Doppler shift (i.e., rotation in the complex plane) typically dominates the random phase variations that are due to Doppler spread. In such conditions, a Doppler estimator that uses an argument-crossing algorithm registers phase rotations that are mainly due to changes in Doppler shift, and thus is highly likely to underestimate the velocity, and the AFC would again remain in low-speed mode.

The risk of AFC wrap-around is high for devices that implement AFC either with only a low-speed mode of operation or with Doppler estimators that use the usual algorithms, which do not reliably detect high-speed situations in LOS environments. Therefore, there is a need for methods and apparatus that solve the AFC wrap-around problem.

SUMMARY

In one aspect of this invention, there is provided a method of detecting an automatic frequency control (AFC) wrap-around event based on a signal received through a communication channel. The method includes the steps of collecting a first plurality of channel parameters; carrying out typical AFC computations using the first plurality of channel parameters; collecting a second plurality of wrap-around channel parameters; carrying out wrap-around AFC computations using the wrap-around channel parameters; and detecting a wrap-around event based on results of the wrap-around AFC computations.

In another aspect of this invention, there is provided an apparatus for detecting wrap-around events based on signals received through a communication channel. The apparatus includes a RAKE processor configured to generate correlated signals from a signal received through the communication channel; a channel estimator configured to generate channel parameters of the communication channel from correlated signals, the channel parameters including a first plurality of channel parameters and a second plurality of wrap-around channel parameters; an automatic frequency controller (AFC) configured to generate at least one of a first angle signal φ and a first control signal $f_{err}$ based on the first plurality of channel parameters; and a wrap-around detector configured to generate at least one of a second angle signal $\phi^{wa}$ and a second control signal $f_{err}^{wa}$ based on the second plurality of channel parameters. A wrap-around event is detected based on at least one of the second angle signal and the second control signal.

BRIEF DESCRIPTION OF THE DRAWINGS

The several features, objects, and advantages of this invention will be understood by reading this description in conjunction with the drawings, in which.

DETAILED DESCRIPTION

In accordance with aspects of the invention as described in more detail below, an AFC wrap-around event can be detected by performing AFC-like operations on one or more additional channel parameters, such as channel estimates, of the strongest communication path. In this description, an "AFC wrap-around event" is the folding phenomenon that occurs when the phase difference between two consecutive channel parameters used in the AFC is larger than $\pi$ radians. Also in this description, channel estimates are used for the channel parameters, but it will be appreciated that other channel parameters can be used. Once a wrap-around event is detected, a correct frequency reference can be restored either by forcing the AFC into a higher-speed mode of operation, which gives the AFC a chance to restore the correct frequency reference, or by applying a momentary frequency reference change, e.g., of $\pm\frac{1}{2}\Delta t$ Hz. The latter may be used for example when the AFC does not have a high-speed mode of operation.

Thus, instead of generating, for example, one channel parameter for a time slot in low-speed mode, at least two wrap-around channel parameters, e.g., two wrap-around channel estimates $\hbar_1^{wa}$, $\hbar_2^{wa}$, are generated for the time slot for the strongest RAKE finger, which can be identified in any of many suitable ways that are known in the art. If more than two wrap-around parameters are generated, one may combine them, e.g., by averaging. It is currently believed that it is important to obtain the wrap-around channel parameters from the strongest RAKE finger (i.e., the LOS link). For example, the wrap-around channel estimates $\hbar_1^{wa}$, $\hbar_2^{wa}$ can be spaced $t_s/N$ s apart, where $t_s$ is the slot width, which in some communication systems is $\frac{1}{1500}$ s, and N is a positive number larger than zero, e.g., 5. Such a spacing is convenient when the AFC has the exemplary high- and low-speed modes that are described above. It will be appreciated, however, that sampling spacings other than $t_s/N$ can be used and that in general shorter sampling intervals are preferable to longer ones. Typically, but not necessarily, one of the wrap-around channel estimates is the same as a channel estimate already used by the typical AFC operations in low-speed mode.

Having the wrap-around channel estimates, the AFC or another suitable programmable processor or logic device, performs the following computations in parallel to the typical AFC operations described above:

$$y^{wa} = \hbar_2^{wa}(\hbar_1^{wa})^*$$

$$y_{filt}^{wa} = \lambda^{wa}(y^{wa} - y_{filt}^{wa,(previous)}) + y_{filt}^{wa,(previous)}$$

$$f_{err}^{wa} = \phi^{wa}/2\pi\Delta t$$

where the asterisk denotes complex conjugation, $\lambda^{wa}$ is a filter parameter, $f_{err}^{wa}$ is a wrap-around frequency error, $\phi^{wa}=\arg(y_{filt}^{wa})$ is a wrap-around phase angle, and $\Delta t$ is the sampling interval of the wrap-around channel estimates. In the example in which the estimates are spaced $t_s/N$ apart and the slot width $t_s$ is $\frac{1}{1500}$ and N is 5, $\Delta t = \frac{1}{7500}$. The similarity of these wrap-around computations to the typical AFC computations described above may be noted, and it will again be understood that filtering is optional.

Any of the following criteria can be used to detect a wrap-around event based on the results from the above computations with the wrap-around channel estimates and the results of the typical AFC computations with typical channel estimates. It will be understood that the following expressions are based on the example in which the wrap-around estimates are spaced $t_s/N$ apart and the slot width $t_s$ is $\frac{1}{1500}$ and N is 5, with one channel estimate per slot used in low-speed mode.

A first criterion is that if the channel estimates have rotated more between the two wrap-around samples from the same slot than the angle indicated by the reported frequency error $f_{err}$ (where the elapsed time is N=5 times as long), then it is likely that a wrap-around event has occurred and the speed mode should be set to a higher mode. This comparison of computation results can be expressed as follows:

$$\text{speed mode} = \begin{cases} \text{high,} & \text{if } |\phi^{wa}| > \alpha|\phi| \\ & \text{(or, equivalently, if } |f_{err}^{wa}| > N\alpha|f_{err}|), \\ \text{low,} & \text{otherwise} \end{cases} \quad (1)$$

where $\alpha \geq 1$ is a parameter that is conveniently adjusted to avoid toggling between higher- and low-speed modes when the angles $\phi^{wa}$ and $\phi$ are both small. For example, $\alpha$ may be a value between 1 and 1.1, but this is not the only possible choice, which generally depends on how one wants to balance the probability of a false alarm (wrap-around detection declared when wrap-around event did not occur) against the probability of a miss (wrap-around event occurred but was not detected due to noise or a large $\alpha$). These probabilities depend on the SNR, of course, and $\alpha$ could typically be determined by experiment.

A second alternative criterion is to compare the reported frequency error $f_{err}$ with $f_{err}^{wa}$. This can be expressed as follows:

$$\text{speed mode} = \begin{cases} \text{high,} & \text{if } |f_{err}^{wa}| > \alpha |f_{err}|, \\ \text{low,} & \text{otherwise} \end{cases} \quad (2)$$

The comparison in expression (2) can detect wrap-around events earlier than the comparison in expression (1), but with a possibly higher risk of false alarms when the angles $\phi^{wa}$ and $\phi$ are small.

A third alternative criterion is simply to compare the wrap-around result to a threshold, which can be expressed as follows:

$$\text{speed mode} = \begin{cases} \text{high,} & \text{if } |\varphi^{wa}| > \pi/N, \\ \text{low,} & \text{otherwise} \end{cases} \quad (3)$$

and which corresponds to a rotation angle of more than $\pi$ during one slot, or more generally during the period between low-speed mode channel estimates. This may be the most robust of the three criteria given by expressions (1), (2), and (3) because the risk of false alarm is lowest. With the third criterion, the risk that channel impairments (e.g., noise, interference, etc.) cause an angle of $\pi/5$ can usually be considered to be smaller than the risks that noisy channel estimates cause unnecessary speed-mode changes in the other two alternatives.

To reduce the probability of a missed wrap-around event even further, one may lower the wrap-around detection threshold somewhat, e.g., $|\phi^{wa}|>\pi/5-\beta$, where $\beta$ is a selectable parameter. For example, $\beta$ may be zero as in the simulations shown, but it is currently believed that values between 0 and about $0.1\pi/5$ may be useful. Even so, these are not the only possible choices, which generally depend on how one wants to balance the probability of a false alarm against the probability of a miss (wrap-around event occurred but was not detected due to noise or a small $\beta$). These probabilities depend on the SNR, of course, and $\beta$ could typically be determined by experiment.

It is currently believed that the best performance may be achieved by using the results from the above computations with the wrap-around channel estimates and the results of the typical AFC computations with the typical channel estimates in combination with standard Doppler estimation to determine the AFC speed mode. With a Doppler estimator, expression (3) is then modified to the following:

$$\text{speed mode} = \begin{cases} \text{high,} & \text{if } |\varphi^{wa}| > \pi/N \text{ OR } \hat{f}_D \Rightarrow \text{high} \\ \text{low} & \text{otherwise} \end{cases} \quad (4)$$

in which $\hat{f}_D \Rightarrow$ high denotes that the estimated Doppler frequency spread $\hat{f}_D$ indicates selection of a higher-speed mode. Expressions (1) and (2) can also be changed correspondingly to include use of Doppler estimates.

Figure 5:
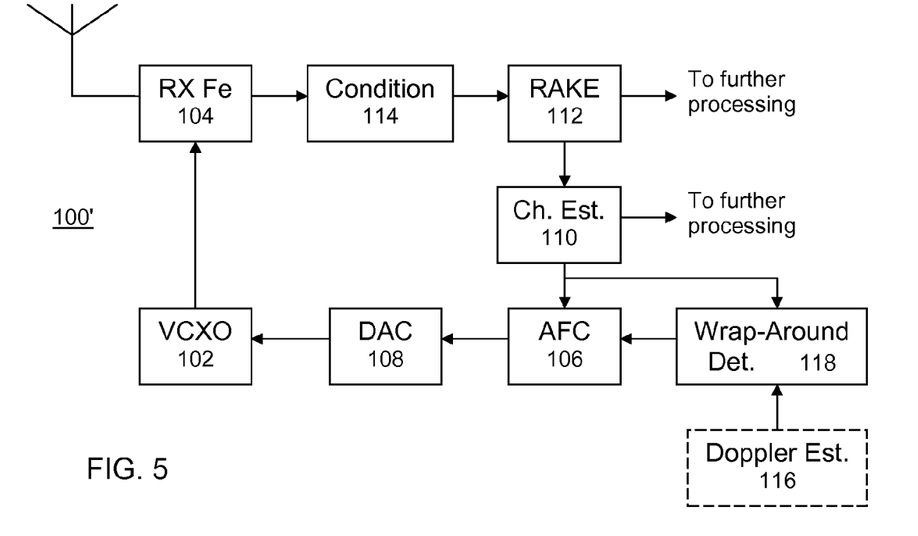
FIG. 5 is a block diagram of a wrap-around detection apparatus.

It will be noted that the wrap-around computations of $\phi^{wa}$ and $f_{err}^{wa}$ may performed in the AFC 106, in the channel estimator 110, or in another suitable processor, and that the comparison criteria and speed-mode setting may be implemented separately or in concert with the computations of $\phi^{wa}$ and $f_{err}^{wa}$. FIG. 5 is a block diagram of a portion of an improved apparatus 100' showing parts involved in AFC operation and wrap-around detection. The blocks 102, 104, 106, 108, 110, 112, 114, 116 operate in substantially the same way as they do in the apparatus 100 depicted by FIG. 1, except to the extent necessary for the channel estimator 110 to generate the two or more wrap-around channel estimates. In FIG. 5, a wrap-around detector 118 receives those wrap-around channel estimates and (possibly) the Doppler estimates from Doppler estimator 116, and carries out the computations and applies the comparison criteria of expressions (1), (2), (3), or (4) in order to generate a speed-mode control signal that it provides to the AFC 106.

If the wrap-around detector 118 has forced the AFC 106 into high-speed mode, it is important that the AFC 106 stays in high-speed mode until the wrap-around is resolved and the correct frequency reference is restored. This may not work well if the Doppler estimator 116 decides by itself when the apparatus 100' should go back to low-speed mode. To make sure that the wrap-around has been resolved, the rotation angle of the channel estimates can be checked to determine that the angle is less than $\pi$ over the time period between low-speed-mode channel samples, e.g., one time slot. Accordingly, the following comparison criterion can be implemented when the AFC is in high-speed mode:

$$\text{speed mode} = \begin{cases} \text{low,} & \text{if } |N\varphi| < \pi \text{ AND } \hat{f}_D \Rightarrow \text{low} \\ \text{high,} & \text{otherwise} \end{cases} \quad (5)$$

in which $\hat{f}_D \Rightarrow$ low denotes that the estimated Doppler frequency spread $\hat{f}_D$ indicates selection of low-speed mode and $|N\phi|<\pi$ is equivalent to $|\Delta f|<750$ Hz. Due to the AFC filtering, the comparison in expression (5) should preferably not be relied on directly after the speed-mode changes from low to high. Instead, the AFC should stay in high-speed mode for at least a minimum period of time, e.g., $x_{high}$ slots, to reduce the risk of speed-mode toggling. Typically, $x_{high}$ can be determined by experiment, although a value of about 100 may be suitable, with the best choice depending on the particular implementation and filter constants.

Figure 6:
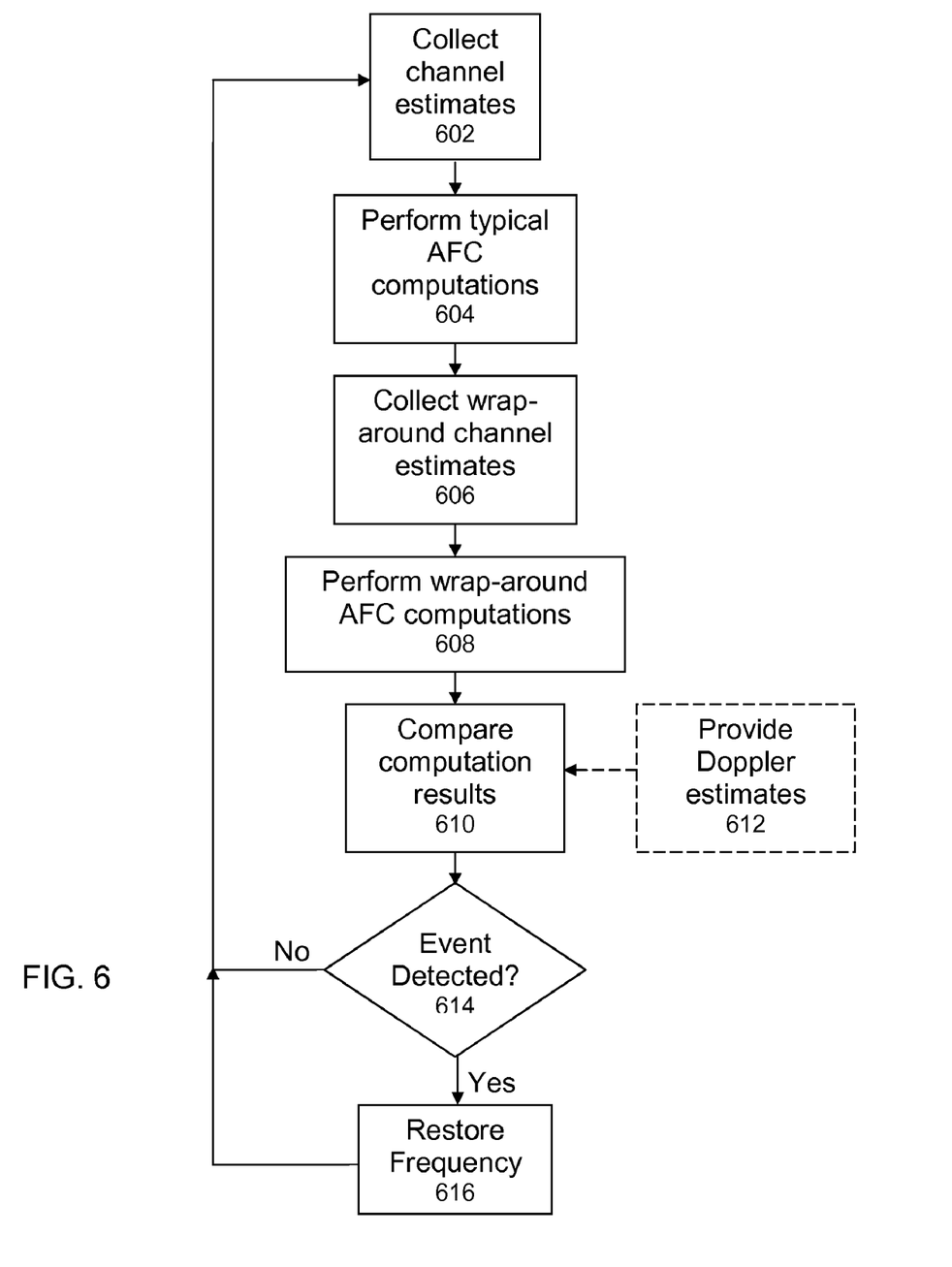
FIG. 6 is a flow chart of a method of wrap-around event detection and a method of restoring a frequency reference.

FIG. 6 is a flow chart of a wrap-around event detection method that can be implemented by the apparatus depicted by FIG. 5. In step 602, channel estimates are collected, and the typical AFC computations using those channel estimates are performed in step 604. Contemporaneously with steps 602 and 604, two wrap-around channel estimates are collected in step 606, and wrap-around computations using the wrap-around channel estimates are performed in step 608. In step 610, either the results of the typical AFC computations and the wrap-around computations are compared according to expressions (1) or (2), or the wrap-around computation result is compared to a threshold according to expression (3). If estimates of the Doppler spread are provided (step 612), the expressions (1)-(3) may be modified as illustrated by expression (4). Based on the comparison, a decision about whether a wrap-around event has occurred can be made (step 614).

If a wrap-around event is detected (Yes in step 614), the proper LO frequency can be restored (step 616) either by forcing the AFC into high-speed mode as described above or by momentarily changing the frequency as described in more detail below, and the flow returns to step 602. If a wrap-around event is not detected (No in step 614), the flow returns to step 602.

Figure 7:
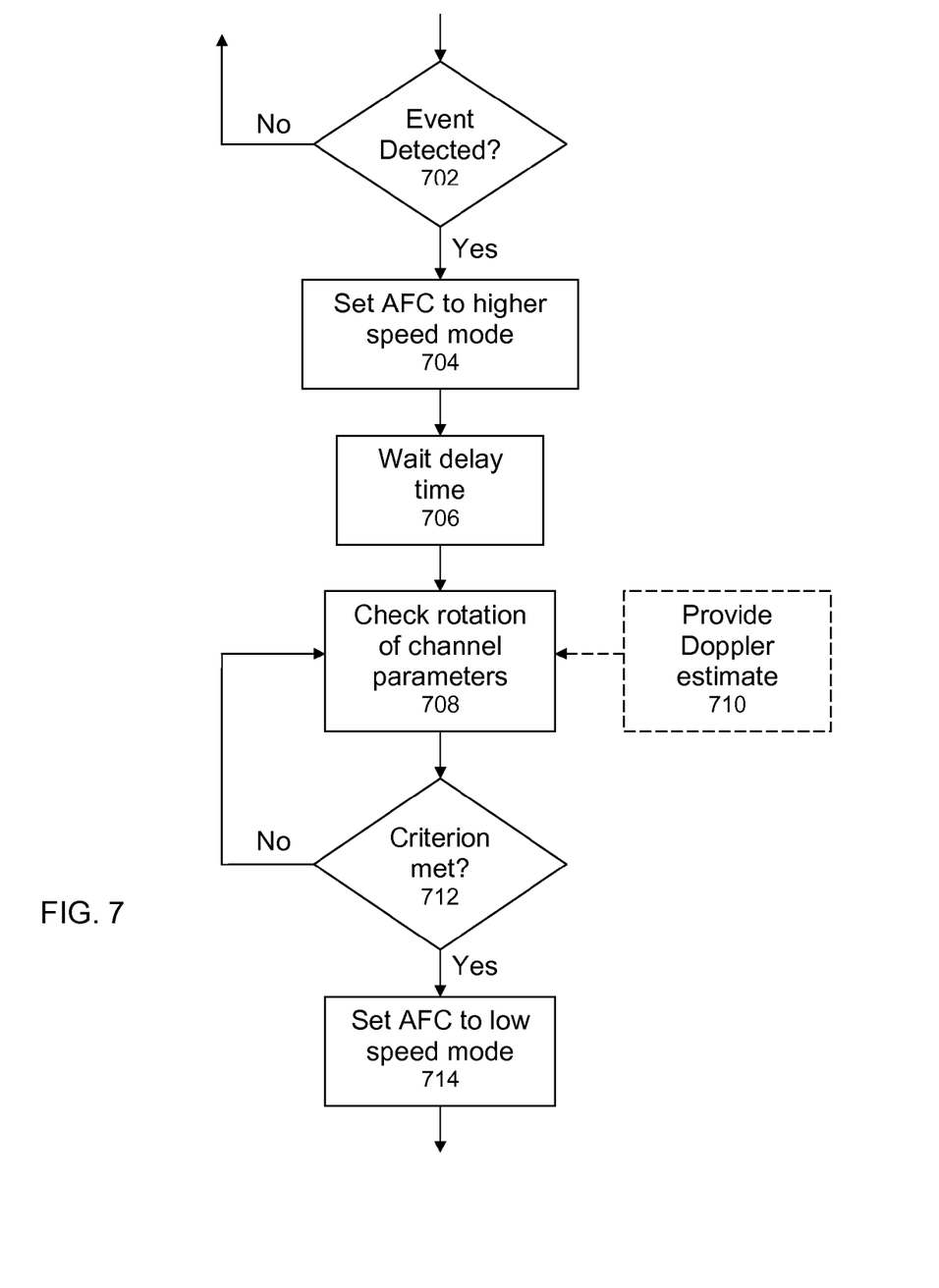
FIG. 7 is a flow chart of a method of returning to low-speed mode after a wrap-around event has been detected.

FIG. 7 is a flow chart of a method of returning to low-speed mode after a wrap-around event has been detected and the AFC has been forced into a higher-speed mode. These steps can be included in the step of restoring the proper LO frequency, which is step 616 in FIG. 6. If the wrap-around detector 118 indicates a wrap-around event (Yes in step 702), the AFC is set to the higher-speed mode (step 704). If the wrap-around detector 118 does not indicate a wrap-around event (No in step 702), then the process flow returns to step 602 as shown in FIG. 6.

After the AFC is set to the higher-speed mode (step 704), the AFC may remain in high-speed mode for at least a minimum period of time (step 706) that can be measured by a suitable timer, e.g., a counter that counts a number $x_{high}$ samples. Waiting a delay time helps ensure that the AFC has enough time to build up a correct reported frequency error $f_{err}$, and then whether the actual frequency error is small enough for the AFC's low speed mode to handle can be checked. Thus, after the lapse of the delay period, the rotation angle of the channel parameters is checked (step 708) to determine whether the angle is less than $\pi$ radians over the time period between low-speed-mode channel samples, e.g., one time slot. The checking step advantageously implements the comparison criterion of expression (5), which may include provision of a Doppler estimate (step 710). If the criterion is met (Yes in step 712), the AFC is set to low-speed mode (step 714), and the flow continues as shown in FIG. 6. If the criterion is not met (No in step 712), the AFC remains in the higher-speed mode, and processing returns to step 708 for further subsequent checking of the rotation angle.

Figure 8:
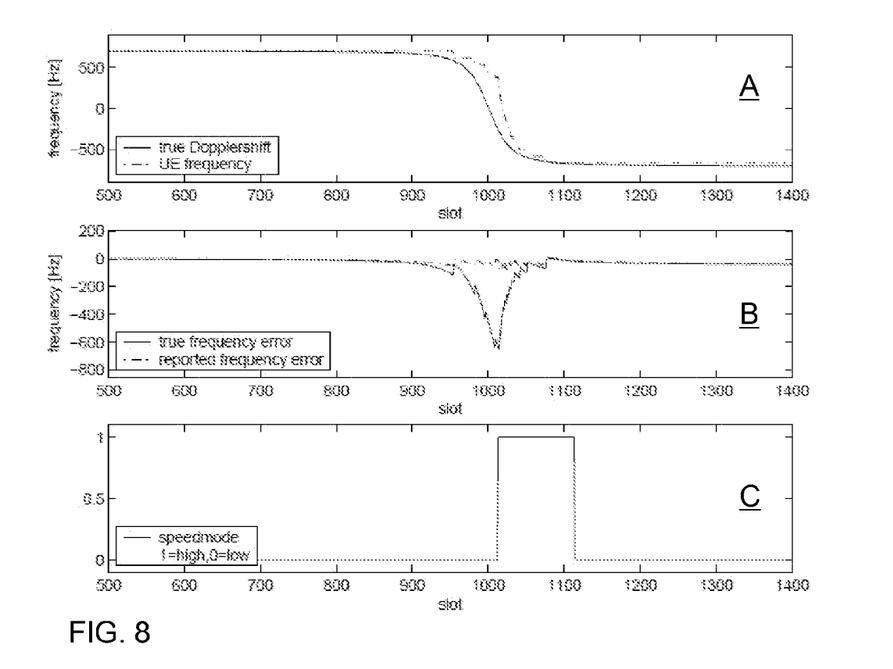
FIG. 8 shows the results of a simulation of a wrap-around detection apparatus closely passing a base station at a distance of two meters at a speed of 350 km/h without filtering.
Figure 9:
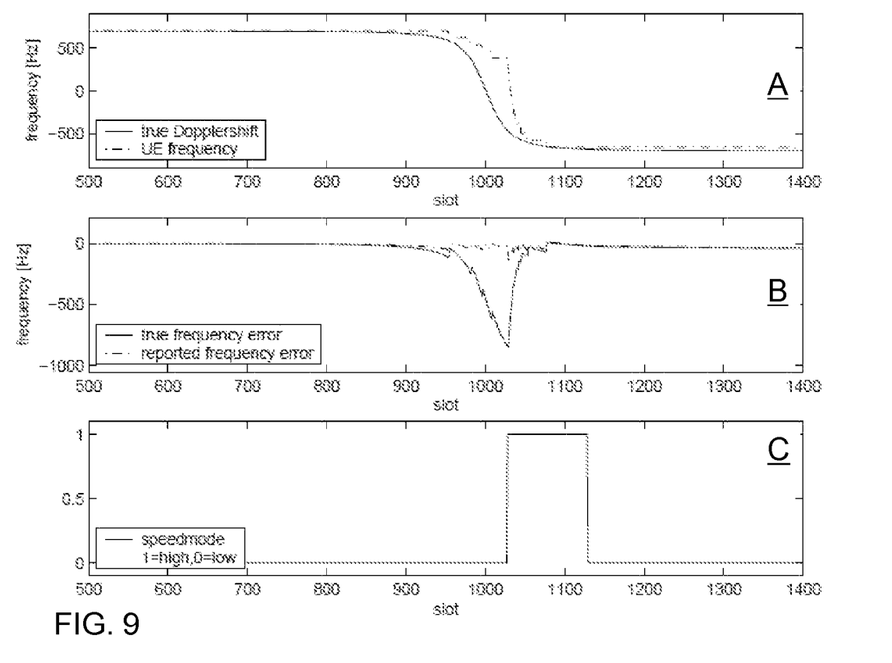
FIG. 9 shows the results of a simulation of a wrap-around detection apparatus closely passing a base station at a distance of two meters at a speed of 350 km/h with filtering.

FIGS. 8 and 9 depict the results of simulations of the wrap-around detection apparatus 100' in close-passing situations. The wrap-around detector 118 was implemented according to expressions (3) and (5) in the simulations. No Doppler spread estimate was present, and hence expression (5) was implemented without using the Doppler estimate $\hat{f}_D$. In FIG. 8, the relative velocity was 350 km/h and there was no filtering of wrap-around values, i.e., $\lambda^{wa}=1$. In FIG. 9, the relative velocity was 350 km/h and there was filtering of wrap-around values, using $\lambda^{wa}=0.25$.

In FIGS. 8A, 9A, the dot-dash line shows the apparatus frequency reference (without the carrier frequency component), and the solid line shows the actual Doppler frequency shift. In FIGS. 8B, 9B, the dot-dash line shows the AFC reported frequency error $f_{err}$, and the solid line shows the actual frequency error. In FIGS. 8C, 9C, the state of the AFC speed mode is indicated by the solid line, with a zero value indicating low-speed mode and a unit value indicating high-speed mode. Frequency shift or error is also shown on the vertical axes and time in slots is shown on the horizontal axes in the figures.

From FIGS. 8 and 9, it can be seen that the correct frequency reference was restored in all of the simulated cases.

As an alternative to forcing the AFC into high-speed mode when a wrap-around event is detected by the above-described computations and expressions (1)-(4), a UE or other device might remain in low-speed mode and change its frequency reference up or down momentarily by a predetermined amount, e.g., by $\pm 1/\Delta t$ Hz where the sign of the change is determined by the sign of $f_{err}^{wa}$ as follows:

$$\Delta f_{UE} = \text{sign}(f_{err}^{wa}) \frac{1}{\Delta t}$$

It can be noted that this alternative can be applied even when an AFC 106 does not have a high-speed mode of operation.

Results of simulations of the wrap-around detection apparatus 100' with such momentary up or down frequency changes are shown in FIG. 9 for a close-passing situation in which the relative velocity was 350 km/h. The wrap-around detector was implemented according to expression (3) with filtering, i.e., $\lambda^{wa}=0.25$.

Figure 10:
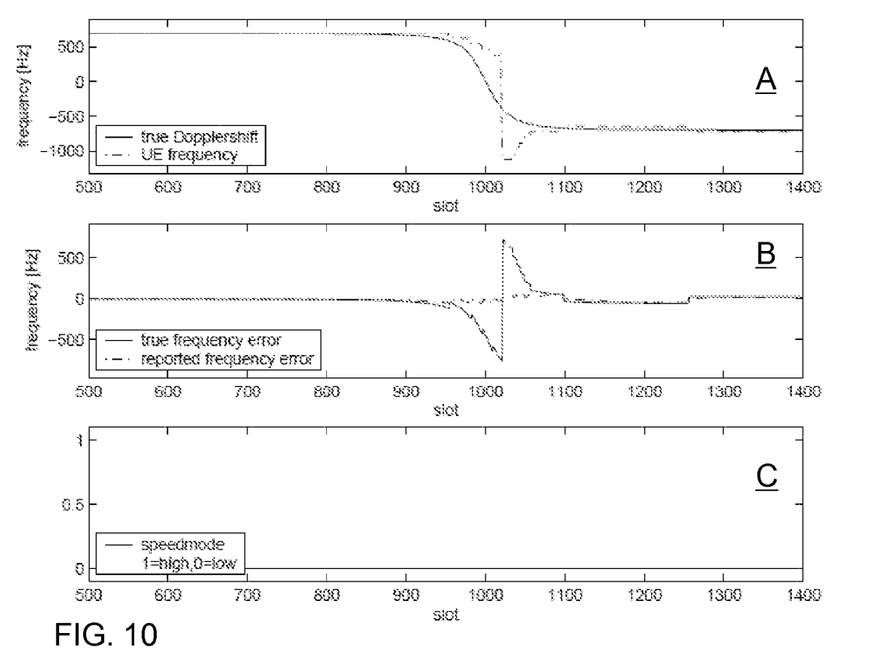
FIG. 10 shows the results of a simulation of an alternative wrap-around detection apparatus closely passing a base station at a distance of two meters at a speed of 350 km/h with filtering.

In FIG. 10A, the dot-dash line shows the apparatus frequency reference (without the carrier frequency component), and the solid line shows the actual Doppler frequency shift. In FIG. 10B, the dot-dash line shows the AFC reported frequency error $f_{err}$, and the solid line shows the actual frequency error. In FIG. 10C, the state of the AFC speed mode is indicated by the solid line, with a zero value indicating low-speed mode and a unit value indicating high-speed mode. Frequency shift or error is also shown on the vertical axes and time in slots is shown on the horizontal axes in the figures.

It will be noted that using the wrap-around detection apparatus with a momentary frequency change makes it possible to restore the correct frequency reference within less than 100 slots without going to high-speed mode. Thus, the probability of a receiver's losing synchronization is efficiently reduced.

As described above, AFC wrap-around detection apparatus and methods are reliable and robust and can be used to avoid loss of synchronization due to an incorrect frequency reference. It is believed possible to detect wrap-around events in all situations at realistic velocities, e.g., when $|\phi^{wa}\phi| \leq 2\pi - \pi/5$, which corresponds to velocities less than about 1600 km/h. Detection of a wrap-around event can trigger either high-speed mode AFC operation or a momentary AFC frequency adjustment, the latter of which can be used even if no high-speed mode operation is implemented in the AFC. Implementation cost is currently expected to be modest, especially if a filter is omitted (i.e., $\lambda^{wa}=1$). It is also believed to be fairly robust against, for example, noisy channel estimates and other impairments.

It will be appreciated that procedures described above are carried out repetitively as necessary, for example, to respond to the time-varying nature of communication channels between transmitters and receivers. In addition, in terms of the downlink and a UE, it will be understood that the methods and apparatus described here can be implemented in a BS or other uplink receiving node. The methods and apparatus may also be applied in devices intended for peer-to-peer communication, e.g., Bluetooth® devices.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless receivers implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of detecting an automatic frequency control (AFC) wrap-around event based on a signal received through a communication channel, comprising the steps of:
    collecting, by a receiver, a first plurality of channel parameters;
    carrying out typical AFC computations using the first plurality of channel parameters;
    collecting, by the receiver, a second plurality of wrap-around channel parameters;
    carrying out wrap-around AFC computations using the second plurality of wrap-around channel parameters; and
    detecting the AFC wrap-around event based on results of the wrap-around AFC computations.

2. The method of claim 1, wherein the detecting step comprises the step of comparing results of the wrap-around AFC computations with results of the typical AFC computations.

3. The method of claim 2, wherein results of the wrap-around AFC computations and results of the typical AFC computations are compared according to one of $$\text{speed mode} = \begin{cases} \text{high,} & \text{if } |\varphi^{wa}| > \alpha|\varphi| \\ & \text{(or, equivalently, if } |f_{err}^{wa}| > N\alpha|f_{err}|), \\ \text{low,} & \text{otherwise} \end{cases}$$

and $$\text{speed mode} = \begin{cases} \text{high,} & \text{if } |f_{err}^{wa}| > \alpha|f_{err}|, \\ \text{low,} & \text{otherwise} \end{cases}$$

in which $\phi^{wa}$ is a wrap-around phase angle, $\phi$ is a phase angle, $\alpha$ is a parameter, $f_{err}^{wa}$ is a wrap-around frequency error, $f_{err}$ is a frequency error, and N is a positive number.

4. The method of claim 1, wherein the detecting step comprises the step of comparing results of the wrap-around AFC computations with a threshold.

5. The method of claim 4, wherein the results of the wrap-around AFC computations are compared according to one of $$\text{speed mode} = \begin{cases} \text{high,} & \text{if } |\varphi^{wa}| > \pi/N, \\ \text{low,} & \text{otherwise} \end{cases}$$

and $$\text{speed mode} = \begin{cases} \text{high,} & \text{if } |\varphi^{wa}| > \pi/N \text{ OR } \hat{f}_D \Rightarrow \text{high} \\ \text{low} & \text{otherwise} \end{cases}$$

in which $\phi^{wa}$ is a wrap-around phase angle, N is a positive number, and $\hat{f}_D$ is a Doppler frequency spread estimate.

6. The method of claim 1, further comprising the steps of generating a Doppler estimate of the signal received through the communication channel, and modifying the AFC wrap-around event detecting step based on the Doppler estimate.

7. The method of claim 1, further comprising the step of, if the AFC wrap-around event is detected, restoring a proper reference frequency either by forcing automatic frequency control into a higher-speed mode or by momentarily changing a present reference frequency.

8. The method of claim 7, wherein the restoring step comprises the steps of:
    checking a rotation angle of at least one of the second plurality of wrap-around channel parameters; and
    based on the rotation angle, setting either a low-speed mode or the high-speed mode.

9. The method of claim 8, wherein the restoring step further comprises waiting a delay period, and the rotation angle is checked against a comparison criterion of $$\text{speed mode} = \begin{cases} \text{low,} & \text{if } |N\varphi| < \pi \text{ AND } \hat{f}_D \Rightarrow \text{low} \\ \text{high,} & \text{otherwise} \end{cases}$$

in which N is a positive number, $\phi$ is a phase angle, and $\hat{f}_D$ is a Doppler frequency spread estimate.

10. An apparatus for detecting wrap-around events based on signals received through a communication channel, comprising:
    a RAKE processor configured to generate correlated signals from a signal received through the communication channel;
    a channel estimator configured to generate channel parameters of the communication channel from the correlated signals, the channel parameters including a first plurality of channel parameters and a second plurality of wrap-around channel parameters;
    an automatic frequency controller (AFC) configured to generate at least one of a first phase angle $\phi$ and a first frequency error $f_{err}$ based on the first plurality of channel parameters; and
    a wrap-around detector configured to generate at least one of a second wrap-around phase angle $\phi^{wa}$ and a second wrap-around frequency error $f_{err}^{wa}$ based on the second plurality of wrap-around channel parameters;
    wherein a wrap-around event is detected based on at least one of the second wrap-around angle signal and the second wrap-around control signal.

11. The apparatus of claim 10, wherein the wrap-around event is detected based on comparison of either the first angle signal and the second wrap-around angle signal or the first control signal and the second wrap-around control signal according to one of $$\text{speed mode} = \begin{cases} \text{high,} & \text{if } |\varphi^{wa}| > \alpha|\varphi| \\ & \text{(or, equivalently, if } |f_{err}^{wa}| > N\alpha|f_{err}|), \\ \text{low,} & \text{otherwise} \end{cases}$$

and $$\text{speed mode} = \begin{cases} \text{high,} & \text{if } |f_{err}^{wa}| > \alpha|f_{err}|, \\ \text{low,} & \text{otherwise} \end{cases}$$

in which $\phi^{wa}$ is the second wrap-around phase angle $\phi$ is the first phase angle, $\alpha$ is a parameter, $f_{err}^{wa}$ is the second wrap-around frequency error, $f_{err}$ is the first frequency error, and N is a positive number.

12. The apparatus of claim 10, wherein the wrap-around event is detected based on comparison of at least one of the second wrap-around phase angle and the second wrap-around frequency error with a threshold.

13. The apparatus of claim 12, wherein the comparison is according to one of $$\text{speed mode} = \begin{cases} \text{high,} & \text{if } |\varphi^{wa}| > \pi/N, \\ \text{low,} & \text{otherwise} \end{cases}$$

and $$\text{speed mode} = \begin{cases} \text{high,} & \text{if } |\varphi^{wa}| > \pi/N \text{ OR } \hat{f}_D \Rightarrow \text{high} \\ \text{low} & \text{otherwise} \end{cases}$$

in which $\phi^{wa}$ is the second wrap-around phase angle, N is a positive number, and $\hat{f}_D$ is a Doppler frequency spread estimate.

14. The apparatus of claim 10, further comprising a Doppler estimator configured to generate an estimate of a Doppler frequency spread of the signal received through the communication channel, wherein the wrap-around event is detected based on at least one of the second wrap-around phase angle and the second wrap-around frequency error and on the estimate of the Doppler frequency spread.

15. The apparatus of claim 10, wherein the AFC has a high-speed mode and a low-speed mode.

16. The apparatus of claim 15, wherein if the wrap-around event is detected, either the AFC is forced into the higher-speed mode or a reference frequency is momentarily changed.

17. The apparatus of claim 16, wherein a rotation angle of at least one of the second plurality of wrap-around channel parameters is checked; and based on the rotation angle, either the low-speed mode or the high-speed mode is set.

18. The apparatus of claim 10, further comprising a voltage-controlled crystal oscillator configured to generate a local oscillator (LO) signal, a frequency of the LO signal being responsive to a signal from the AFC.

19. The apparatus of claim 10, wherein the apparatus is included in a user equipment for a communication system.

20. The apparatus of claim 10, wherein the apparatus is included in a base station for a communication system.

* * * * *